US008313832B2

(12) United States Patent
Smith et al.

(10) Patent No.: US 8,313,832 B2
(45) Date of Patent: Nov. 20, 2012

(54) INSULATION PAPER WITH HIGH THERMAL CONDUCTIVITY MATERIALS

(75) Inventors: James D Smith, Monroeville, PA (US); Gary Stevens, Surrey (GB); John W Wood, Winter Springs, FL (US)

(73) Assignee: Siemens Energy, Inc., Orlando, FL (US)

( * ) Notice: Subject to any disclaimer, the term of this patent is extended or adjusted under 35 U.S.C. 154(b) by 0 days.

(21) Appl. No.: 12/837,582

(22) Filed: Jul. 16, 2010

(65) Prior Publication Data

US 2010/0276628 A1 Nov. 4, 2010

Related U.S. Application Data

(63) Continuation of application No. 11/106,846, filed on Apr. 15, 2005, now abandoned.

(60) Provisional application No. 60/580,023, filed on Jun. 15, 2004.

(51) Int. Cl.
*B32B 5/16* (2006.01)
*D21F 11/00* (2006.01)
*D21H 11/00* (2006.01)

(52) U.S. Cl. ........ 428/324; 428/323; 428/328; 162/138; 162/181.8

(58) Field of Classification Search ........................ None
See application file for complete search history.

(56) References Cited

U.S. PATENT DOCUMENTS 3,207,641 A 9/1965 Small et al.
3,246,271 A 4/1966 Ford
3,427,189 A 2/1969 Brechna
3,866,316 A 2/1975 Takechi et al.
3,974,302 A 8/1976 Croop et al.
4,001,616 A 1/1977 Lonseth et al.
4,160,926 A 7/1979 Cope et al.
4,335,367 A 6/1982 Mitsui et al.
4,361,661 A 11/1982 Jackson
4,400,226 A 8/1983 Horrigan
4,427,740 A 1/1984 Stackhouse et al.
4,491,618 A 1/1985 Kuwajima et al.
4,634,911 A 1/1987 Studniarz et al.
4,694,064 A 9/1987 Tomalia et al.
4,704,322 A 11/1987 Roberts
4,760,296 A 7/1988 Johnston et al.
4,806,806 A 2/1989 Hjortsberg et al.
5,011,872 A 4/1991 Latham et al.
5,037,876 A 8/1991 Birkle et al.
5,126,192 A 6/1992 Chellis et al.
5,281,388 A 1/1994 Palmer et al.
5,409,968 A * 4/1995 Clatanoff et al. ............. 523/204
5,466,431 A 11/1995 Dorfman et al.
5,510,174 A 4/1996 Litman
5,540,969 A 7/1996 Schuler
5,578,901 A 11/1996 Blanchet-Fincher et al.
5,688,382 A 11/1997 Besen et al.
5,723,920 A 3/1998 Markovitz et al.
5,780,119 A 7/1998 Dearnaley et al.
5,801,334 A 9/1998 Theodorides
5,878,620 A 3/1999 Gilbert et al.
5,904,984 A 5/1999 Smith et al.
5,938,934 A 8/1999 Balogh et al.
5,982,056 A 11/1999 Koyama et al.
6,015,597 A * 1/2000 David .......................... 427/577
6,048,919 A 4/2000 McCullough
6,103,382 A 8/2000 Smith et al.
6,130,495 A 10/2000 Schulten et al.
6,130,496 A 10/2000 Takigawa et al.
6,140,590 A 10/2000 Baumann et al.
6,160,042 A 12/2000 Ishida
6,190,775 B1 2/2001 Smith et al.
6,238,790 B1 5/2001 Smith et al.
6,251,978 B1 6/2001 McCullough
6,255,738 B1 7/2001 Distefano et al.
6,261,424 B1 7/2001 Goncharenko et al.
6,261,481 B1 7/2001 Akatsuka et al.
6,265,068 B1 7/2001 David et al.
6,288,341 B1 9/2001 Tsunoda et al.
6,313,219 B1 11/2001 Taylor-Smith
6,344,271 B1 2/2002 Yadav et al.
6,359,232 B1 3/2002 Markovitz et al.
6,393,642 B1 5/2002 Pollman et al.
6,396,864 B1 5/2002 O'Brien et al.
6,426,578 B1 7/2002 Mori et al.
6,432,537 B1 8/2002 Devlin et al.
6,504,102 B2 1/2003 Tsunoda et al.
6,506,331 B2 1/2003 Meguriya
6,509,063 B1 1/2003 McCarthy et al.
6,510,059 B2 1/2003 Mitani et al.

(Continued)

FOREIGN PATENT DOCUMENTS

EP 0 157 936 A1 10/1985

(Continued)

OTHER PUBLICATIONS

Tari et al., "Impacts on Turbine Generator Design by the Application of Increased Thermal Conducting Stator Insulation" Cigre SC11-01 Meeting, Paper No. 132 (2002).

(Continued)

*Primary Examiner* — Camie Thompson

(57) ABSTRACT

The present invention provides for a high thermal conductivity (HTC) paper that comprises a host matrix, such as mica, and HTC materials intercalated into the host matrix. The HTC materials are comprised of at least one of nanofillers, diamond like coatings directly on the host matrix, and diamond like coatings on the nanofillers.

16 Claims, No Drawings

U.S. PATENT DOCUMENTS

| | | | |
|---|---|---|---|
| 6,548,172 | B2 | 4/2003 | David et al. |
| 6,572,937 | B2 | 6/2003 | Hakovirta et al. |
| 6,632,561 | B1 | 10/2003 | Bauer et al. |
| 6,635,720 | B1 | 10/2003 | Tomalia et al. |
| 6,746,758 | B2 | 6/2004 | Tsunoda et al. |
| 6,821,672 | B2 | 11/2004 | Zguris |
| 6,882,094 | B2 | 4/2005 | Dimitrijevic et al. |
| 6,905,655 | B2 | 6/2005 | Gabriel et al. |
| 6,974,627 | B2 | 12/2005 | Morita et al. |
| 7,033,670 | B2 | 4/2006 | Smith |
| 7,042,346 | B2 | 5/2006 | Paulsen |
| 7,120,993 | B2 | 10/2006 | Yamamoto et al. |
| 7,180,409 | B2 | 2/2007 | Brey |
| 7,189,778 | B2 | 3/2007 | Tobita et al. |
| 7,425,366 | B2 | 9/2008 | Okamoto et al. |
| 7,547,847 | B2 | 6/2009 | Miller |
| 2002/0058140 | A1 | 5/2002 | Dana et al. |
| 2002/0070621 | A1 | 6/2002 | Mori et al. |
| 2002/0098285 | A1 | 7/2002 | Hakovirta et al. |
| 2002/0146562 | A1 | 10/2002 | Morita et al. |
| 2003/0035960 | A1 | 2/2003 | Tsunoda et al. |
| 2003/0040563 | A1 | 2/2003 | Sagal et al. |
| 2003/0139510 | A1 | 7/2003 | Sagal et al. |
| 2004/0094325 | A1 | 5/2004 | Yoshida et al. |
| 2004/0102597 | A1 | 5/2004 | Tobita et al. |
| 2004/0122153 | A1 | 6/2004 | Guo et al. |
| 2004/0152829 | A1 | 8/2004 | Tobita et al. |
| 2004/0241439 | A1 | 12/2004 | Morita et al. |
| 2005/0097726 | A1 | 5/2005 | Yamamoto et al. |
| 2005/0116336 | A1 | 6/2005 | Chopra et al. |
| 2005/0161210 | A1 | 7/2005 | Zhong et al. |
| 2005/0208301 | A1 | 9/2005 | Okamoto et al. |
| 2005/0236606 | A1 | 10/2005 | Toas et al. |
| 2005/0245644 | A1 | 11/2005 | Smith et al. |
| 2005/0274450 | A1 | 12/2005 | Smith et al. |
| 2005/0274540 | A1 | 12/2005 | Smith et al. |
| 2005/0274774 | A1 | 12/2005 | Smith et al. |
| 2005/0277349 | A1 | 12/2005 | Smith et al. |
| 2005/0277350 | A1 | 12/2005 | Smith et al. |
| 2005/0277351 | A1 | 12/2005 | Smith et al. |
| 2005/0277721 | A1 | 12/2005 | Smith et al. |
| 2006/0034787 | A1 | 2/2006 | Bujard |
| 2006/0142471 | A1 | 6/2006 | Shindo |
| 2006/0231201 | A1 | 10/2006 | Smith et al. |
| 2006/0234027 | A1 | 10/2006 | Huusken |
| 2006/0234576 | A1 | 10/2006 | Smith et al. |
| 2006/0258791 | A1 | 11/2006 | Okamoto et al. |
| 2006/0280873 | A1 | 12/2006 | Smith et al. |
| 2006/0281380 | A1 | 12/2006 | Smith et al. |
| 2006/0281833 | A1 | 12/2006 | Smith et al. |
| 2007/0026221 | A1 | 2/2007 | Stevens et al. |
| 2007/0114704 | A1 | 5/2007 | Stevens et al. |
| 2007/0141324 | A1 | 6/2007 | Stevens et al. |
| 2007/0222307 | A1 | 9/2007 | Sawa et al. |
| 2008/0050580 | A1 | 2/2008 | Stevens et al. |
| 2008/0066942 | A1 | 3/2008 | Miller |
| 2008/0262128 | A1 | 10/2008 | Stevens et al. |
| 2009/0238959 | A1 | 9/2009 | Smith et al. |

FOREIGN PATENT DOCUMENTS

| | | | |
|---|---|---|---|
| EP | 0 266 602 | A1 | 5/1988 |
| EP | 0 394 767 | A2 | 10/1990 |
| EP | 0 604 804 | A2 | 7/1994 |
| EP | 1 220 240 | A1 | 7/2002 |
| EP | 1 300 439 | A1 | 4/2003 |
| EP | 1 383 226 | A1 | 1/2004 |
| EP | 1 384 567 | A1 | 1/2004 |
| EP | 1 486 997 | A1 | 12/2004 |
| EP | 1 530 223 | A1 | 5/2005 |
| GB | 881036 | A2 | 11/1961 |
| JP | 55-053802 | | 4/1980 |
| JP | 56-029305 | | 3/1981 |
| JP | 62-154650 | A | 7/1987 |
| JP | 62154650 | A | 7/1987 |
| JP | 62169489 | A | 7/1987 |
| JP | 03-205443 | A | 9/1991 |
| JP | 06-076624 | | 3/1994 |
| JP | 06-313267 | A | 11/1994 |
| JP | 06340414 | A | 12/1994 |
| JP | 08-020673 | | 1/1996 |
| JP | 10-088201 | | 4/1998 |
| JP | 10-130496 | A | 5/1998 |
| JP | 10130496 | A | 5/1998 |
| JP | 10-211659 | | 8/1998 |
| JP | 2000034693 | A | 2/2000 |
| JP | 2000149662 | A | 5/2000 |
| JP | 2001274302 | A | 10/2001 |
| JP | 2002-212422 | A | 7/2002 |
| JP | 2002528854 | T | 9/2002 |
| JP | 2002-322243 | A | 11/2002 |
| JP | 2002330562 | A | 11/2002 |
| JP | 2003530661 | T | 10/2003 |
| JP | 2004035782 | A | 5/2004 |
| JP | 2005-06389 | A | 1/2005 |
| JP | 2005-199562 | A | 7/2005 |
| WO | WO 95/02504 | A1 | 1/1995 |
| WO | WO 96/28073 | A1 | 9/1996 |
| WO | WO 98/41993 | A1 | 9/1998 |
| WO | WO 99/26286 | A1 | 5/1999 |
| WO | WO 00/56127 | A1 | 9/2000 |
| WO | WO 01/68749 | A1 | 9/2001 |
| WO | WO 01/84659 | A1 | 11/2001 |
| WO | WO 03/040445 | A1 | 5/2003 |
| WO | WO 2004/006271 | A1 | 1/2004 |
| WO | WO 2004/052999 | A2 | 6/2004 |
| WO | WO 2004/067606 | A1 | 8/2004 |
| WO | WO 2005/069312 | | 7/2005 |
| WO | WO 2005/106089 | A2 | 11/2005 |
| WO | WO 2005/123825 | A2 | 12/2005 |
| WO | WO 2005/124790 | A2 | 12/2005 |
| WO | WO 2006/002014 | A1 | 1/2006 |
| WO | WO 2006/007385 | A1 | 1/2006 |

OTHER PUBLICATIONS

Sun et al., "Fundamental Research on Surface Modification of Nano-sized Silica for Underfill Applications" 2004 Electronic Components and Technology Conference (2004).

Brutsch et al., "New High Voltage Insulation with Increased Thermal Conductivity" Electrical Electronics Insulation Conference 1993 Proceedings, (Oct. 1993).

Tari et al., "A High Voltage System with Increased Thermal Conductivity for Turbo Generators" Coil Winding, Insulation and Electrical Manufacturing Conference (2001).

Von Roll Isola, "Mica Tapes," product literature, 381.58, date unknown.

Tomoyuki Matsumura "Phase Structures and Thermal and Conductive Properties of Epoxy-Alumina Hybrids Filled with Conductive Fillers," STN Database No. 2002:257918, Apr. 8, 2002, Abstract pp. 1-2; XP-002356007.

Yasufumi Shibata, "Lipophillic Inorganic-Organic Fillers with Low Frictional Coefficient," STN Database No. 2002:568167, Jul. 31, 2002, Abstract pp. 1-3; XP-002355912.

Derwent Acc-No. 1980-39239C (JP 55053802 A Derwent Abstract) (Nippon Mica Seisaku) 1978.

Product Data Sheet for Polar Therm Boron Nitride Powder Grades PT120, PT140, PT160, and PT 180, provided by Momentive Performance Materials (2007).

POSS® Enhanced Thermosets, Product Brochure from Hybrid Products, Inc., date unknown.

Production Information Sheet for D.E.R.™ 330 (Liquid Epoxy Resin) from The Dow Chemical Co., date unknown.

Abstract of JP 10-130496 (from espacenet.com) and Partial Translation of JP 10-130496.

Abstract of JP 62-154650 (from espacenet.com) and Partial Translation of JP 62-154650.

* cited by examiner

INSULATION PAPER WITH HIGH THERMAL CONDUCTIVITY MATERIALS

CROSS-REFERENCE TO RELATED APPLICATIONS

This application is a continuation application of U.S. patent application Ser. No. 11/106,846, now abandoned, filed Apr. 15, 2005, by Smith, et al., which claims priority to U.S. Provisional Application No. 60/580,023, filed Jun. 15, 2004, each of which is incorporated herein by reference. This application is further related to U.S. patent application Ser. No. 11/106.847, entitled "Fabrics with High Thermal Conductivity Coatings" filed Apr. 15, 2005, by Smith, et al., which is also incorporated herein by reference.

FIELD OF THE INVENTION

The field of the invention relates to increasing the thermal conductivity of paper used in electrical insulation.

BACKGROUND OF THE INVENTION

With the use of any form of electrical appliance, there is a need to electrically insulate conductors. With the push to continuously reduce the size and to streamline all electrical and electronic systems there is a corresponding need to find better and more compact insulators and insulation systems.

Good electrical insulators, by their very nature, also tend to be good thermal insulators, which is undesirable. Thermal insulating behavior, particularly for air-cooled electrical equipment and components, reduces the efficiency and durability of the components as well as the equipment as a whole. It is desirable to produce electrical insulation systems having maximum electrical insulation and minimal thermal insulation characteristics.

Though many factors affect the art of electrical insulation, the field would benefit even more from the ability to transfer heat, without reducing other desired physical characteristics of the insulators. What is needed is improved electrical insulation materials that have a thermal conductivity higher than that of conventional materials, but that does not compromise the electrical insulation and other performance factors including structural integrity.

Electrical insulation often appears in the form of tapes, which themselves have various layers. Common to these types of tapes is a paper layer that is bonded at an interface to a fiber layer, both layers tending to be impregnated with a resin. The paper layer will be composed of materials that are highly electrically insulating, such as mica. Improvements to mica tapes include catalyzed mica tapes as taught in U.S. Pat. No. 6,103,882. If the thermal conductivity of the paper, independent from or in conjunction with its use in a tape, can be improved then electrical system will see a marked improvement. Other problems with the prior art also exist, some of which will be apparent upon further reading.

SUMMARY OF THE INVENTION

With the foregoing in mind, methods and apparatuses consistent with the present invention, which inter alia facilitates the thermal conductivity of insulating paper by intercalating high thermal conductivity (HTC) materials onto and/or into the host matrix of the insulating paper. The HTC materials of the present invention can be of a variety of types, such as nanofillers or surface coatings, and both nanofillers and surface coatings each comprise various sub-groups unto themselves. The HTC materials can be added to the paper at a variety of stages, such as when the paper is in its raw materials, or substrate, stage, when the paper is being formed, or after the paper has been formed. Mica is a particular kind of substrate for insulating paper due to its high electrical resistivity.

The insulating paper may stand alone or be combined with other materials to form an insulating tape. These other materials typically comprise a fibrous backing, such a glass, and a resin impregnator. The other materials may also be intercalated with HTC materials to produce a combined HTC material tape product.

These and other objects, features, and advantages in accordance with the present invention are provided particular embodiments by in one embodiment the present invention provides for an HTC paper that comprises a host matrix, such as mica, and HTC materials intercalated into the host matrix. The HTC materials are comprised of at least one of nanofillers, diamond like coatings directly on the host matrix, and diamond like coatings on the nanofillers.

In a particular embodiment the HTC materials comprise 0.1-65% by volume of the HTC paper, and in a further particular embodiment the HTC materials comprise 1-25% by volume of the HTC paper. The resistivity of the HTC paper is about $10^{12}$-$10^{16}$ Ohm cm and the thermal conductivity of the paper after impregnation with a resin is greater than 0.5 W/mK.

In another embodiment the present invention provides for an electrically insulating tape that comprises a mica paper layer with intercalated HTC materials, a glass fiber backing layer, and an interface between the mica paper layer and the glass fiber backing layer. Resin is impregnated through the mica paper layer and the glass fiber backing layer. The HTC materials are comprised of at least one of nanofillers, diamond like coatings directly on the host matrix, and diamond like coatings on the nanofillers, and comprise 1-25% by volume of the mica paper.

In still another embodiment the present invention provides for a method of making HTC paper that comprises obtaining a substrate and intercalating HTC materials onto the substrate, where the HTC materials comprise nanofillers that are intercalated into the substrate by at least one of introducing a solvent containing the nanofillers onto the substrate then evaporating the solvent, and adding the nanofillers as a dry powder to the substrate, where the dry powder contains a polymer, then melting the dry powder onto the substrate. A paper product is then produced from the substrate. The nanofillers may be surface coated, such as by a DLC and the HTC paper may be combined into a HTC electrical insulation tape.

In another embodiment the method comprises a method of making HTC paper that comprises obtaining a substrate, such as mica, and intercalating HTC materials onto the substrate. The substrate is then turned into a paper product where the HTC materials comprise a surface coating, such as a DLC, that have dispersed onto the substrate by deposition.

Another embodiment provides for method of making HTC paper that comprises obtaining a substrate and introducing the substrate into a paper making slurry. HTC materials are added to the paper making slurry such that the HTC materials intercalate into the substrate, and the slurry is run though a paper making process. Often there are polymers present at this point to allow the substrate to bind to itself better. The HTC materials comprise nanofillers that intercalate into the substrate by using the slurry as a solvent.

In another embodiment there is provided a method of making HTC paper that comprises obtaining a host matrix, which is a formed electrically insulating paper product and intercalating HTC materials onto the host matrix. The HTC materials intercalate into the substrate, such that the HTC bind to the material that makes up the paper. If the HTC materials are nanofillers they are added by mixing the nanofillers with a solvent, impregnating the solvent onto the host matrix, and evaporating the solvent. If the HTC materials is a DLC it is added to the host matrix by deposition.

This paper may then be combined into a HTC electrical insulation tape. The HTC materials can be added in whole or in part prior to the paper being combined into the tape, or the HTC materials can be added in whole or in part after the paper being combined into the tape.

Other embodiments of the present invention also exist, which will be apparent upon further reading of the detailed description.

DETAILED DESCRIPTION OF THE INVENTION

The present invention provides for the incorporation of high thermal conductivity (HTC) materials into and onto the substrate used in paper insulation, such as the types used in electrical insulating tapes. Insulating tapes tend to comprise a host matrix, such as mica, that is formed into a paper, that is often then impregnated with resin or accelerator or both. Before or after being impregnated, the paper used in tapes is added to a high tensile strength backing, such as glass or polymer film. The host matrix of an insulating tape acts as a very good electrical insulator, but also insulates thermally as well, which is an undesired side effect.

It is therefore desired to increase the thermal conductivity of the substrate. As used herein substrate refers to the host material that the insulating paper is formed from, while matrix refers to the more complete paper component made out of the substrate. These two terms may be used somewhat interchangeable when discussing the present invention. The increase of thermal conductivity should be accomplished without significantly impairing the electrical properties, such as dissipation factor, or the physical properties of the substrate, such as tensile strength and cohesive properties. The physical properties can even be improved in some embodiments, such as with surface coatings. In addition, in some embodiments the electrical resistivity of the host matrix can also be enhanced by the addition of HTC materials.

The HTC materials can be added to the substrate or matrix at one or more of the various stages of manufacture of the insulating paper. Distinct stages in the manufacture of an insulating paper exist. For the purpose of the present invention, these can be separated into three stages. The raw material stage, the slurry stage, and the paper product stage. For example, a mica paper begins as mica which is converted to flakes then to mica flakelets that are then combined with a liquid into a slurry, which is then run through a machine to produce a mica paper.

In addition to the standard mica (Muscovite, Phlogopite) that is typically used for electrical insulation there is also Biotite mica as well as several other Mica-like Alumino-Silicate materials such as Kaolinite, Halloysite, Montmorillonite and Chlorite. Montmorillonite has lattices in its structure which can be readily intercalated with HTC materials such as metal cations, organic compounds and monomers and polymers to give high dielectric strength composites.

The addition of HTC materials can occur at any or all of the production stages. Each of these stages, of course, will comprise of multiple sub-stages at which the HTC material may be added. The process of applying the HTC materials at the various stages will have to account for the difference in physical characteristics of the host matrix at these various stages. For example, adding the HTC materials to loose mica flakes or mica flakelets is different than adding the materials to the mica in the slurry or the paper product. HTC materials may also be present in other component parts of the finished insulating tape, such as the backing fabric, or the interlayer bonding resins.

The process of manufacture of insulating paper combines thermal, chemical, and mechanical treatments individually or in combinations, to produce a pulp that is then transformed into sheets that make up the paper. HTC-materials can be added to the raw material stage either in the dry form or contained in a liquid or other medium. The HTC material is added to the substrate, such as dry mica flakelets, and intermixed to form, in one instance, a homogeneous distribution within the substrate. Methods such as heat may be used to remove the liquid medium that delivers the HTC materials to the substrate.

HTC materials are incorporated into the matrix at the slurry stage by adding them to a suspension in an agglomerated or non-agglomerated form in a liquid carrier. Aggregation of the HTC material is generally not preferred at this stage but in some cases it may be used depending on the nature of the aggregate structure. Surfactants, chemical surface preparation, or pH control may be used to ensure the particles do not aggregate or that they aggregate in particular ways. If the HTC are to some degree self aligning or can be aligned by external forces then full dispersion on mixing may not be necessary.

In the slurry stage the fillers may either be added as a powder or as a suspension in a liquid phase. The liquid can be of a variety of types used in the art, though water is typical. The water itself can be deionized, demineralized, or have additives to control its pH value.

To add the HTC materials into the paper product the fillers may be incorporated into a suitable solvent as a suspension. Examples are typical organic solvents such as hexane, toluene, methylethylketone etc.. Similarly, it is desired that the HTC material be uniformly distributed in the liquid as a non-aggregated suspension. The size distribution of the particles may be chosen to fulfill the desired objective in relation to the void size distribution in host matrix. The HTC material size and shape distribution may be employed to influence the thermal conductivity and other physical properties, and use can be made of the different close packing behavior of such components or of their different aggregation or self-assembling behavior, to achieve this.

At the slurry or paper product stage, the solvents may also contain one or more accelerators, such a zinc naphthenate and other metal-salts or organometallics, which may be used to accelerate the reaction of a later impregnated resin. HTC material can be added together with the accelerator in a common solvent or accelerator.

The present invention inserts HTC materials into a host matrix, or substrate, such as a mica and polyester. Other substrate components include glass flakes, and Kapton™, which is a polyimide, or Mylar™ which is a polyester such as polyethylene terephthalate. The HTC materials can be applied to any and all external and internal surfaces. Although flakes are a common first stage substrate, some types of substrate materials may use different physical formations, or even combinations of physical formations that can form composite paper that can be multi-layered or continuous.

The term HTC material refers to particles that increase the thermal conductivity of the host matrix. In one embodiment these are nanofillers having dimensions of about 1-1000 nm. These may be spherical, platelets or have a high aspect ratio such as whiskers, rods or nanotubes, and their related assembled forms such as aggregates, fibrillar dendrites, ropes, bundles and nets and other forms. In addition, HTC materials also refers to coatings, such as diamond like coatings (DLC) and various metal oxides, nitrides, carbides and mixed stoichiomertric and non-stoichiometric combinations that can be applied to the host matrix. As will be discussed, it is possible to combine HTC materials, such as combination of nano, mesa or micro spheres and rods, or a DLC or metal oxide coating on nano, meso or micro particulates. It is also important to note that there may be diamond nanofillers of various forms, which are distinct from diamond like coatings. Since many paper insulators are eventually impregnated with resins, it is an objective of these embodiments that the HTC materials increase the thermal conductivity of the matrix after impregnation. After impregnation the particles may cause an increase in thermal conductivity by forming a thermally conducting network on the surfaces of the host matrix particles or with the impregnating resin or some combination of both. The impregnating resin may also have HTC materials of its own, which can act in conjunction with, or independent of the HTC materials intercalated with the insulating paper.

The HTC materials therefore further comprise nano, meso, and micro inorganic HTC-materials such as silica, alumina, magnesium oxide, silicon carbide, boron nitride, aluminium nitride, zinc oxide and diamond, as well as others, that give higher thermal conductivity. These materials can have a variety of crystallographic and morphological forms and they may be processed with the host matrix either directly or via a solvent which acts as a carrier liquid. Solvents may be the preferred delivery system when the HTC-materials are added into the matrix at stages such as the paper product.

In one embodiment, the HTC materials are dendrimers, and in another embodiment they are nano or micro inorganic fillers having a defined size or shape including high aspect ratio particles with aspect ratios (ratio mean lateral dimension to mean longitudinal dimension) of 3 to 100 or more, with a more particular range of 10-50.

In one embodiment the surface coating of nano, meso and micro inorganic fillers having the desired shape and size distribution and the selected surface characteristics and bulk filler properties are complimentary to each other. This enables better percolation of the host matrix and independent interconnection properties are controlled independently while maintaining required bulk properties.

In regards to shape, the present invention utilizes shapes tending towards natural rods and platelets for enhanced percolation in the host matrix with rods being the most preferred embodiment including synthetically processed materials in addition to those naturally formed. A rod is defined as a particle with a mean aspect ratio of approximately 5 or greater, with particular embodiments of 10 or greater, though with more particular embodiments of no greater than 100. In one embodiment, the axial length of the rods is approximately in the range 10 nm to 100 microns. Smaller rods will percolate a host matrix better when added to a finished host matrix using a solvent.

Many micro particles form spheroidal, ellipsoidal and discoidal shapes, which have reduced ability to distribute evenly under certain conditions and so may lead to aggregated filamentary structures that reduce the concentration at which percolation occurs. By increasing the percolation, the thermal properties of the substrate can be increased, or alternately, the amount of HTC material that needs to be added to the substrate can be reduced. Also, the enhanced percolation results in a more uniform distribution of the HTC materials within the substrate rather than agglomeration which is to be avoided, creating a more homogenous product that is less likely to have undesired interfaces, incomplete particle wetting and micro-void formation. Likewise aggregated filamentary or dendritic structures, rather than globular (dense) aggregates or agglomerates, formed from higher aspect ratio particles confer enhanced thermal conductivity In one embodiment the dendrimer comprises discrete organic-dendrimer composites in which the organic-inorganic interface is non-discrete with the dendrimer core-shell structure. Dendrimers are a class of three-dimensional nanoscale, core-shell structures that build on a central core. The core may be on of an organic or inorganic material. By building on a central core, the dendrimers are formed by a sequential addition of concentric shells. The shells comprise branched molecular groups, and each branched shell is referred to as a generation. Typically, the number of generations used is from 1-10, and the number of molecular groups in the outer shell increase exponentially with the generation. The composition of the molecular groups can be precisely synthesized and the outer groupings may be reactive functional groups. Dendrimers are capable of linking with a host matrix, as well as with each other. Therefore, they may be added to a host as an HTC material.

Generally, the larger the dendrimer, the greater its ability to function as a phonon transport element. However, its ability to permeate the material and its percolation potential can be adversely affected by its size so optimal sizes are sought to achieve the balance of structure and properties required. Like other HTC materials, solvents can be added to the dendrimers so as to aid in their impregnation of a substrate, such as a mica or a glass tape. In many embodiments, dendrimers will be used with a variety of generations with a variety of different molecular groups.

Commercially available organic Dendrimer polymers include Polyamido-amine Dendrimers (PAMAM) and Polypropylene-imine Dendrimers (PPI) and PAMAM-OS which is a dendrimer with a PAMAM interior structure and organo-silicon exterior. The former two are available from Aldrich Chemical™ and the last one from Dow-Corning™.

Similar requirements exist for inorganic-organic dendrimers which may be reacted together or with the substrate. In this case the surface of the dendrimer could contain reactive groups similar to those specified above which will either allow dendrimer-dendrimer, dendrimer-organic, dendrimer-hybrid, and dendrimer-HTC matrix reactions to occur. In this case the dendrimer will have an inorganic core and an organic shell, or vice-versa containing either organic or inorganic reactive groups or ligands of interest. It is therefore also possible to have an organic core with an inorganic shell which also contains reactive groups such as hydroxyl, silanol, vinyl-silane, epoxy-silane and other groupings which can participate in inorganic reactions similar to those involved in common sol-gel chemistries.

The molecular groups can be chosen for their ability to react, either with each other or with a substrate. However, in other embodiments, the core structure of the dendrimers will be selected for their own ability to aid in thermal conductivity; for example, metal oxides as discussed below.

In another embodiment the present invention provides for new electrical insulation materials based on organic-inorganic composites. The thermal conductivity is optimized without detrimentally affecting other insulation properties such as dielectric properties (permittivity and dielectric loss), electrical conductivity, electric strength and voltage endurance, thermal stability, tensile modulus, flexural modulus, impact strength and thermal endurance in addition to other factors such as viscoelastic characteristics and coefficient of thermal expansion, and overall insulation. Organic and inorganic phases are constructed and are selected to achieve an appropriate balance of properties and performance.

Micro and nano HTC particles may be selected on their ability to self aggregate into desired shapes, such as rods and platelets. Particles may be selected for their ability to self-assemble naturally, though this process may also be amplified by external forces such as an electric field, magnetic field, sonics, ultra-sonics, pH control, use of surfactants and other methods to affect a change to the particle surface charge state, including charge distribution, of the particle. In a particular embodiment, particles that exemplify surface coatings, such as boron nitride, aluminum nitride, diamond are made to self assemble into desired shapes. In this manner, the desired rod-shapes can be made from highly thermally conductive materials at the outset or assembled during incorporation into the host matrix.

In many embodiments, the size and shape of the HTC-materials are varied within the same use. Ranges of size and shape are used in the same product. A variety of long and shorter variable aspect ratio HTC-materials will enhance the thermal conductivity of a host matrix, as well as potentially provide enhanced physical properties and performance. One aspect that should be observed, however, is that the particle length does not get so long as to cause bridging between layers of substrate/insulation unless this is by design. Also, a variety of shapes and length will improve the percolation stability of the HTC-materials by providing a more uniform volume filing and packing density, resulting in a more homogeneous matrix. When mixing size and shapes, in one embodiment the longer particles are more rod-shaped, while the smaller particles are more spheroidal, platelet or discoid and even cuboids. For example a matrix containing HTC-materials could contain as low as about 0.1% to as high as 65% HTC materials by volume, with a more particular range begin about 1-25% by volume.

In a related embodiment, the HTC materials may have a defined size and shape distribution. In both cases the concentration and relative concentration of the filler particles is chosen to enable a bulk connecting (or so-called percolation) structure to be achieved which confers high thermal conductivity with and without volume filling to achieve a structurally stable discrete two phase composite with enhanced thermal conductivity. In another related embodiment, the orientation of the HTC materials increases thermal conductivity. In still another embodiment, the surface coating of the HTC materials enhances phonon transport. These embodiments may stand apart from other embodiments, or be integrally related. For example, dendrimers are combined with other types of highly structured materials such as thermoset and thermoplastic materials. They are uniformly distributed through a host matrix such that the HTC materials reduce phonon scattering and provide micro-scale bridges for phonons to produce good thermally conducting interfaces between the HTC materials. The highly structured materials are aligned so that thermal conductivity is increased along a single direction to produce either localized or bulk anisotropic electrically insulating materials. In another embodiment HTC is achieved by surface coating of lower thermal conductivity fillers with metal oxides, carbides or nitrides and mixed systems having high thermal conductivity which are physically or chemically attached to fillers having defined bulk properties, such attachment being achieved by processes such as chemical vapour deposition and physical vapour deposition and also by plasma treatment.

The addition of surface functional groups may include hydroxyl, carboxylic, amine, epoxide, silane or vinyl groups which will be available for chemical reaction with the host matrix. These functional groups may be naturally present on the surface of inorganic fillers or they may be applied using wet chemical methods, non-equilibrium plasma deposition including plasma polymerization, chemical vapour and physical vapour deposition, sputter ion plating and electron and ion beam evaporation methods.

Organic surface coatings, and inorganic surface coatings such as, metal-oxide, -nitride, -carbide and mixed systems may be generated which, when combined with the selected particle size and shape distribution, provide a defined percolation structure with control of the bulk thermal and electrical conductivity of the insulation system while the particle permittivity may be chosen to control the permittivity of the system.

Reactive surface functional groups may be formed from surface groups intrinsic to the inorganic coating or may be achieved by applying additional organic coatings both of which may include hydroxyl, carboxylic, amine, epoxide, silane, vinyl and other groups which will be available for chemical reaction with the host matrix. These single or multiple surface coatings and the surface functional groups may be applied using wet chemical methods, non-equilibrium plasma methods including plasma polymerization and chemical vapour and physical vapour deposition, sputter ion plating and electron and ion beam evaporation methods.

Diamond-Like Carbon Coatings (DLC) have high hardness, low friction, chemical inertness, and can combine high electrical resistivity (~$10^{13}$ Ohm cm) for electrical insulation with high thermal conductivity (>1000 W/mK). There are several methods for producing a DLC, such as plasma assisted chemical vapor deposition (PACVD), physical vapor deposition (PVD), and ion beam deposition (IBD). In general, the DLC is less than one micron thick and is of amorphous carbon and hydrocarbons which results in mixed $sp^2$ and $sp^3$ bonds. The bond ratio can be varied by varying the process parameters, for example the ratio of gases and DC voltage, with resultant changes in properties. The bond ratio can be directly measured using, for example, Raman spectroscopy.

Relatively large areas can be coated quite quickly. For example using a PICVD low pressure non equilibrium process a 20-100 nm coating can be applied to a glass cloth surface approximately 1 sq ft in area in minutes. To control or optimize the coating parameters to reduce, for example, the stress in the coating the DLC can be applied to a bare substrate or substrates that have other coatings. The DLC can be continuous or have gaps in the coverage. Gaps may be advantageous, for example, in allowing for better bonding of an impregnated resin.

In thermal conductivity, phonon transport is enhanced and phonon scattering reduced by ensuring the length scales of the structural elements are shorter than or commensurate with the phonon distribution responsible for thermal transport. Larger HTC particulate materials can actually increase phonon transport in their own right, however, smaller HTC materials can alter the nature of the host matrix, thereby affect a change on the phonon scattering. This may be further assisted by using nano-particles whose matrices are known to exhibit high thermal conductivity and to ensure that the particle size is sufficient to sustain this effect and also to satisfy the length scale requirements for reduced phonon scattering. It is also necessary to consider the choice of structures that are more highly ordered including reacted dendrimer lattices having both short and longer range periodicity and ladder or ordered network structures that may be formed from matrices.

Applying a DLC to particles of nano, meso, micro and larger dimensions enables the size and shape of the high thermal conductivity particles to be engineered, so benefit can be obtained from percolation effects occurring naturally or created. In one example a DLC is applied to quasi-continuously coat the surface of a glass fiber or number of fibers. The surface of the fiber before coating is chosen to promote the desired properties from the coating. The fiber is then broken up by mechanical or other means into short DLC coated rods of the desired dimensional distribution. In another example a DLC coating is appied to flake-shaped particles having a high surface to thickness ratio, mica flakelets and BN particles being examples.

In poly-crystalline and mono-crystalline nano-particulate form, the particles may associate with the surface of a carrier particle, eg silica. Silica by itself is not a strong thermally conducting material, but with the addition of a surface coating it may become more highly thermally conducting. Silica and other such materials, however, have beneficial properties such as being readily formed into rod-shaped particles, as discussed above. In this manner, various HTC properties can be combined into one product. These coatings may also have application to the latter resin impregnation and to the glass components of the insulating tape.

Additionally, fluid flow fields and electric and magnetic fields can be applied to the HTC materials to distribute them. By using alternating or static electric fields, the rod and platelet shapes can be aligned on a micro-scale. This creates a material that has different thermal properties in different directions. The creation of an electric field may be accomplished by a variety of techniques known in the art, such as by attaching electrodes across an insulated electrical conductor or by use of a conductor in the centre of a material or the insulation system.

In another embodiment the present invention provides for new electrical insulation systems based on organic-inorganic composites. The interface between the various inorganic and organic components is made to be chemically and physically intimate to ensure a high degree of physical continuity between the different phases and to provide interfaces which are mechanically strong and not prone to failure during the operation of the electrical insulation system in service in both high and low voltage applications. Such materials have applications in high voltage and low voltage electrical insulation situations where enhanced interfacial integrity would confer advantage in terms of enhanced power rating, higher voltage stressing of the insulation systems, reduced insulation thickness and would achieve high heat transfer.

A particular embodiment uses a variety of surface treatments, nano, meso and micro inorganic fillers, so as to introduce a variety of, surface functional groups which are capable of compatibilizing the inorganic surface with respect to the matrix or to allow chemical reactions to occur with the host matrix. These surface functional groups may include hydroxyl, carboxylic, amine, epoxide, silane or vinyl groups which will be available for chemical reaction with the host organic matrix. These functional groups may be applied using wet chemical methods, non-equilibrium plasma methods, chemical vapour and physical vapour deposition, sputter ion plating and electron and ion beam evaporation methods.

In one embodiment the present invention provides for an HTC paper that comprises a host matrix, such as mica, and HTC materials intercalated into the host matrix. The HTC materials are comprised of at least one of nanofillers, diamond like coatings directly on the host matrix, and diamond like coatings on the nanofillers.

In a particular embodiment the HTC materials comprise 0.1-65% by volume of the HTC paper, and in a further particular embodiment the HTC materials comprise 1-25% by volume of the HTC paper. The resistivity of the HTC paper is about $10^{12}$-$10^{16}$ Ohm cm and the thermal conductivity of the paper after impregnation with a resin is greater than 0.5 W/mK.

In other particular embodiments the nanofillers have an aspect ratio greater than 5, and may also contain dendrimers. They may be combined into a HTC electrical insulation tape, and other components of the tape may also contain HTC materials.

In another embodiment the present invention provides for an electrically insulating tape that comprises a mica paper layer with intercalated HTC materials, a glass fiber backing layer, and an interface between the mica paper layer and the glass fiber backing layer. Resin is impregnated through the mica paper layer and the glass fiber backing layer. The HTC materials are comprised of at least one of nanofillers, diamond like coatings directly on the host matrix, and diamond like coatings on the nanofillers, and comprise 1-25% by volume of the mica paper.

In still another embodiment the present invention provides for a method of making HTC paper that comprises obtaining a substrate and intercalating HTC materials onto the substrate, where the HTC materials comprise nanofillers that are intercalated into the substrate by at least one of introducing a solvent containing the nanofillers onto the substrate then evaporating the solvent, and adding the nanofillers as a dry powder to the substrate, where the dry powder contains a polymer, then melting the dry powder onto the substrate. A paper product is then produced from the substrate. The nanofillers may be surface coated, such as by a DLC and the HTC paper may be combined into a HTC electrical insulation tape.

In another embodiment the method comprises a method of making HTC paper that comprises obtaining a substrate, such as mica, and intercalating HTC materials onto the substrate. The substrate is then turned into a paper product where the HTC materials comprise a surface coating, such as a DLC, that have dispersed onto the substrate by deposition.

Another embodiment provides for method of making HTC paper that comprises obtaining a substrate and introducing the substrate into a paper making slurry. HTC materials are added to the paper making slurry such that the HTC materials intercalate into the substrate, and the slurry is run though a paper making process. Often there are polymers present at this point to allow the substrate to bind to itself better. The HTC materials comprise nanofillers that intercalate into the substrate by using the slurry as a solvent.

In another embodiment there is provided a method of making HTC paper that comprises obtaining a host matrix, which is a formed electrically insulating paper product and intercalating HTC materials onto the host matrix. The HTC materials intercalate into the substrate, such that the HTC bind to the material that makes up the paper. If the HTC materials are nanofillers they are added by mixing the nanofillers with a solvent, impregnating the solvent onto the host matrix, and evaporating the solvent. If the HTC materials is a DLC it is added to the host matrix by deposition.

This paper may then be combined into a HTC electrical insulation tape. The HTC materials can be added in whole or in part prior to the paper being combined into the tape, or the HTC materials can be added in whole or in part after the paper being combined into the tape Although the present invention has been discussed primarily in use with electrical industries, the invention is equally applicable in other areas. Industries that need to increase heat transference would equally benefit from the present invention. For example, the energy industries, inclusive of oil and gas. Other focuses of the present invention include power electronics, printed circuit boards, conventional electronics, and integrated circuits where the increasing requirement for enhanced density of components leads to the need to remove heat efficiently in local and large areas.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the inventions which, is to be given the full breadth of the claims appended and any and all equivalents thereof.

What is claimed is:

1. A structurally stable mica paper comprising:

a host matrix comprising mica flakes defining an electrical insulation layer; and high thermal conductivity materials intercalated within interstices of the host matrix comprising mica flakes;

wherein the high thermal conductivity materials comprise nanofiller particles, nanofiller particles with diamond like coatings, or combinations thereof, the high thermal conductivity materials comprising an aspect ratio of from 3-100;

wherein the high thermal conductivity materials are disposed within the host matrix in the form of filamentary or dendritic structures so as to achieve a structurally stable discrete two phase composite; and wherein the structurally stable mica paper is free from resin.

2. The paper of claim 1, wherein the high thermal conductivity materials comprise 0.1-65% by volume of the paper.

3. The paper of claim 2, wherein the high thermal conductivity materials comprise 1-25% by volume of the paper.

4. The paper of claim 1, wherein the resistivity of the paper is about $10^{12}$- $10^{16}$ Ohm cm.

5. The paper of claim 1, wherein the high thermal conductivity materials are comprised of nanofillers.

6. The paper of claim 1, wherein the high thermal conductivity materials are comprised of nanofillers with diamond like coatings.

7. The paper of claim 1, wherein the paper is combined into an electrical insulation tape.

8. The paper of claim 1, wherein the high thermal conductivity materials have an aspect ratio of from 10-50.

9. The paper of claim 1, wherein the at least one of nanofillers and nanofillers with diamond like coatings have a dimension of from 1-1000 nm.

10. The paper of claim 1, wherein the high thermal conductivity materials are disposed within the host matrix in the form of dendritic structures.

11. The paper of claim 1, wherein the high thermal conductivity materials comprise at least one of silica, alumina, magnesium oxide, silicon carbide, boron nitride, aluminum nitride, zinc oxide, or a diamond material.

12. A high thermal conductivity composite material comprising:

a mixture comprising mica flakelets as a host matrix and high thermal conductivity materials;

wherein the high thermal conductivity materials comprise nanofiller particles, nanofiller particles with diamond like coatings, or combinations thereof;

wherein the high thermal conductivity materials comprise an aspect ratio of from 3-100;

wherein the high thermal conductivity materials are disposed within the host matrix in the form of filamentary or dendritic structures so as to achieve a structurally stable discrete two phase composite; and wherein the high thermal conductivity composite material is free from resin.

13. The high thermal conductivity composite material of claim 12, wherein the composite material is in the form of a dry solid mixture.

14. The high thermal conductivity composite material of claim 12, wherein the composite material is in the form of a slurry.

15. The high thermal conductivity composite material of claim 12, wherein the composite material is in the form of a structurally stable mica paper.

16. The high thermal conductivity composite material of claim 12, wherein the high thermal conductivity materials comprise at least one of silica, alumina, magnesium oxide, silicon carbide, boron nitride, aluminum nitride, zinc oxide, or a diamond material.

* * * * *